US010192070B1

(12) United States Patent
Hodge

(10) Patent No.: US 10,192,070 B1
(45) Date of Patent: Jan. 29, 2019

(54) SYSTEM AND METHOD FOR PROVIDING CONTROLLED ENVIRONMENT RESIDENT STATUS

(71) Applicant: **GLOBAL TEL*LINK CORPORATION**, Reston, VA (US)

(72) Inventor: Stephen Lee Hodge, Aubrey, TX (US)

(73) Assignee: **GLOBAL TEL*LINK CORPORATION**, Reston, VA (US)

( * ) Notice: Subject to any disclaimer, the term of this patent is extended or adjusted under 35 U.S.C. 154(b) by 0 days.

(21) Appl. No.: 15/724,618

(22) Filed: Oct. 4, 2017

(51) Int. Cl.
| | |
|---|---|
| *G06F 21/62* | (2013.01) |
| *G06F 21/32* | (2013.01) |
| *G06Q 50/26* | (2012.01) |
| *G06F 17/30* | (2006.01) |

(52) U.S. Cl.
CPC .......... *G06F 21/6245* (2013.01); *G06F 21/32* (2013.01); *G06F 17/30746* (2013.01); *G06Q 50/26* (2013.01)

(58) Field of Classification Search
CPC .. G06F 21/6245; G06F 21/32; G06F 21/6227; G06F 17/30746; G06Q 50/26
USPC .......................................................... 726/28
See application file for complete search history.

(56) References Cited

U.S. PATENT DOCUMENTS

| | | | | |
|---|---|---|---|---|
| 7,519,375 B2* | 4/2009 | Polozola | ............. | H04L 12/1895 455/404.1 |
| 7,664,689 B1* | 2/2010 | Rosenfield | ............. | G06Q 20/10 705/35 |
| 7,860,222 B1* | 12/2010 | Sidler | ................... | H04L 63/302 379/32.01 |
| 8,180,027 B1* | 5/2012 | Magnuson | .......... | H04M 3/2281 370/352 |
| 8,498,937 B1* | 7/2013 | Shipman, Jr. | .......... | G06Q 40/02 705/35 |
| 9,055,167 B1* | 6/2015 | Keiser | ................... | H04M 15/08 |
| 9,094,500 B1* | 7/2015 | Edwards | ............. | H04M 3/2281 |
| 9,106,789 B1* | 8/2015 | Shipman, Jr. | .......... | H04N 7/147 |
| 9,113,131 B1* | 8/2015 | Passe | ...................... | H04M 3/38 |
| 9,300,791 B1* | 3/2016 | Higgs | ................. | H04M 3/2281 |
| 9,300,798 B1* | 3/2016 | Welker-Muraguri | ....................... | H04M 3/493 |
| 9,311,627 B1* | 4/2016 | Shipman, Jr. | ........ | G06Q 10/107 |
| 9,380,082 B1* | 6/2016 | Keiser | ................... | H04N 7/181 |
| 9,420,094 B1* | 8/2016 | Keiser | ................. | H04M 3/4365 |
| 9,479,651 B1* | 10/2016 | Welker-Muraguri | ....................... | H04M 15/08 |

(Continued)

*Primary Examiner* — Dant B Shaifer Harriman
(74) *Attorney, Agent, or Firm* — Sterne, Kessler, Goldstein & Fox P.L.L.C.

(57) ABSTRACT

Disclosed herein are system, method, and computer program product embodiments for providing controlled environment resident statuses. In an embodiment, a resident status communication system communicates with non-resident communication devices via audio calls and/or textual messages to provide inmate statuses as well as information related to the operation and administration of a correctional facility. The resident status communication system receives requests for information from the non-resident communication devices, determines whether the non-resident is authorized to access the requested information, and provides the requested information in a natural language format to facilitate the user experience. The resident status communication system also allows law enforcement officials and/or correctional facility staff to maintain statuses related to inmates and selectively distribute this information to authorized non-residents.

6 Claims, 5 Drawing Sheets

(56) References Cited

U.S. PATENT DOCUMENTS

| | | | |
|---|---|---|---|
| 9,596,366 B1* | 3/2017 | Smith | H04N 1/00127 |
| 9,680,903 B1* | 6/2017 | Keiser | H04L 67/06 |
| 9,736,428 B1* | 8/2017 | Edwards | H04N 7/152 |
| 9,742,910 B2* | 8/2017 | Keiser | H04M 3/4365 |
| 9,742,935 B1* | 8/2017 | Shipman, Jr. | H04N 1/00241 |
| 9,819,756 B1* | 11/2017 | Welker-Muraguri | H04M 15/08 |
| 9,854,087 B1* | 12/2017 | Solid | H04M 3/2281 |
| 9,858,632 B1* | 1/2018 | Shipman, Jr. | G06Q 50/26 |
| 10,034,153 B1* | 7/2018 | Smith | H04W 4/16 |
| 10,063,692 B2* | 8/2018 | Keiser | H04M 3/2281 |
| 10,063,698 B2* | 8/2018 | Keiser | H04M 3/436 |
| 10,063,700 B1* | 8/2018 | Keiser | H04M 3/42059 |
| 2013/0144863 A1* | 6/2013 | Mayer | G06F 21/6218 707/711 |
| 2013/0328664 A1* | 12/2013 | Torgersrud | G07C 9/00031 340/5.83 |
| 2017/0099387 A1* | 4/2017 | Keiser | H04M 3/4365 |
| 2017/0142368 A1* | 5/2017 | Smith | H04N 1/00127 |
| 2017/0187869 A1* | 6/2017 | Higgs | H04M 3/2281 |
| 2017/0201623 A1* | 7/2017 | Keiser | H04M 3/436 |
| 2017/0201850 A1* | 7/2017 | Raleigh | H04W 4/001 |
| 2017/0251100 A1* | 8/2017 | Keiser | H04L 63/10 |
| 2017/0302885 A1* | 10/2017 | Edwards | H04N 7/152 |
| 2017/0374196 A1* | 12/2017 | Keiser | H04M 3/4365 |
| 2018/0240275 A1* | 8/2018 | Clements | G06Q 50/26 |

* cited by examiner

SYSTEM AND METHOD FOR PROVIDING CONTROLLED ENVIRONMENT RESIDENT STATUS

BACKGROUND

Field

The disclosure relates to a system and method for providing information and statuses related to a controlled environment resident.

Background

After an arrest or conviction, an individual suspected of committing a crime is incarcerated in a jail or prison. During the inmate's stay, non-residents, such as friends or family members, often seek information related to the inmate. For example, family members request information related to inmate communication methods and costs, depositing funds into inmate accounts, visitation hours or rules, and/or how to send items to the inmate. Additionally, non-residents seek information related to an inmate status, such as, for example, whether the inmate has visited the infirmary, if the inmate has borrowed books, the amount of money in an inmate account, or relevant court dates or parole hearing dates for the inmate.

Law enforcement officials or correctional facility staff may not have the resources for handling a large volume of these requests for information or may be wastefully expending resources to handle these requests. Also, for example, correctional facility staff may not even manage inmate statuses in a manner accessible to the public or utilize an effective means for monitoring requests for information from non-residents.

BRIEF DESCRIPTION OF THE DRAWINGS

The accompanying drawings are incorporated herein and form a part of the specification.

Figure 1:
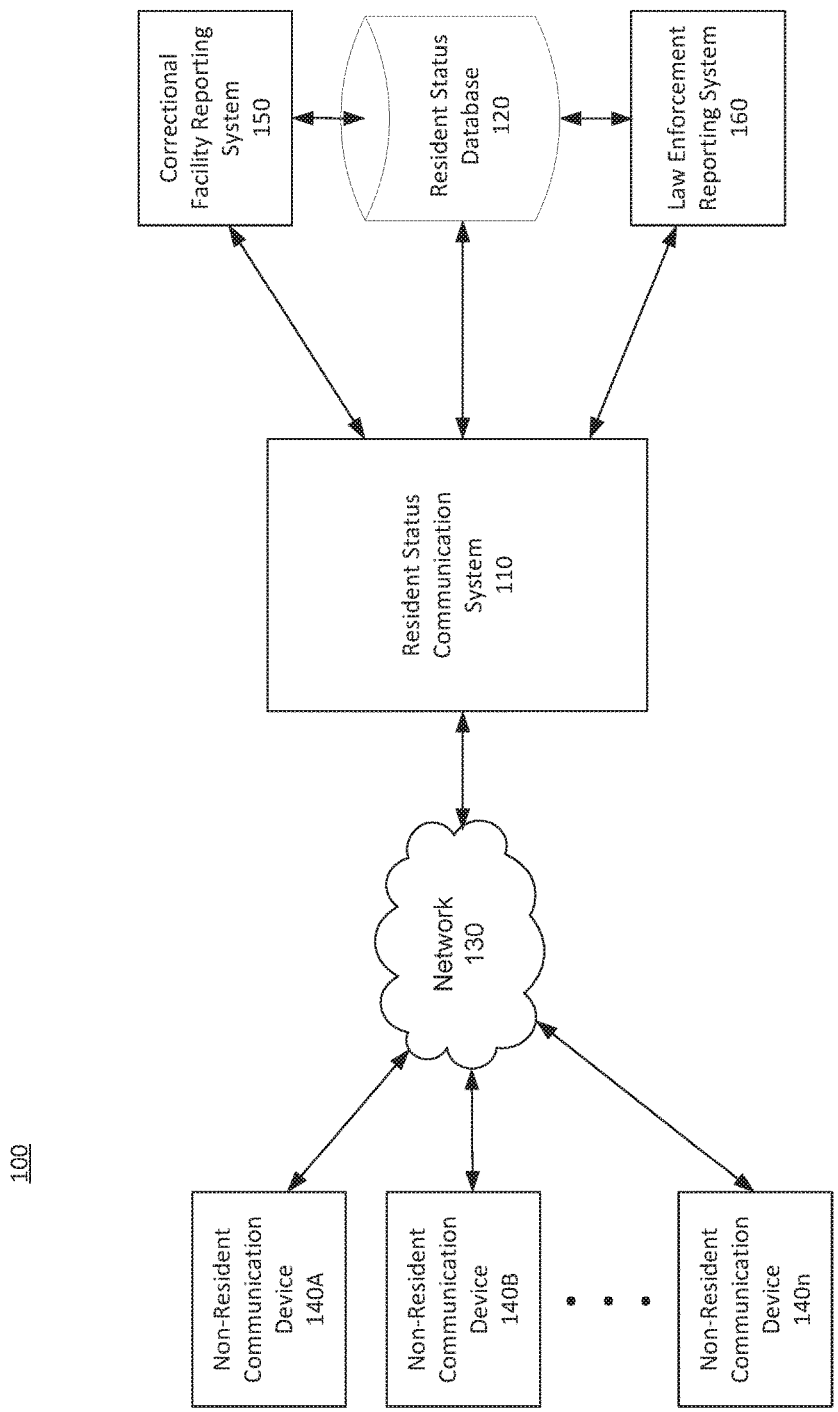
FIG. 1 illustrates a block diagram of a resident status communication environment, according to exemplary embodiments.

The present disclosure will be described with reference to the accompanying drawings. In the drawings, like reference numbers generally indicate identical or similar elements. Additionally, generally, the left-most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, or hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Provided herein are system, apparatus, device, method and/or computer program product embodiments for providing information and statuses related to a controlled environment resident.

In an embodiment, the systems and methods described herein maintain status information related to residents of a jail or prison. For example, a resident status communication system maintains personal information related to the inmates of a correctional facility as well as information related to the operation and administration of the correctional facility. Correctional facility staff and law enforcement officials are also able to update information stored on the resident status communication system or a resident status database. When a non-resident contacts a correctional facility via a phone call or website, the resident status communication system intercepts the incoming request.

In an embodiment, the resident status communication system receives an information request from a non-resident communication device. For example, the information request is a phone call from a non-resident to the correctional facility. The resident status communication system initiates an interactive voice response (IVR) system using artificial intelligence and rules-based natural language processing algorithms as well as a response monitoring system to monitor responses provided. In an embodiment, the IVR system requests identification information from the non-resident so that the resident status communication system can authenticate the non-resident prior to delivering inmate status information. For example, the resident status communication system utilizes a whitelist to determine non-residents authorized to receive personal inmate details. The resident status communication system then interacts with the nonresident via the IVR system to facilitate requested information.

In an embodiment, the requested information relates to administrative or operations details of the correctional facility. For example, the non-resident may ask about visitation hours or package delivery instructions. In these cases, the resident status communication system may not require authentication of the non-resident or may require a lower-level of authentication relative to the amount required to access personal details related to the inmate. In this manner, correctional facility staff or law enforcement officials are able to customize information provided by the resident status communication system and/or the level of authentication required for a non-resident to obtain information. Also, correctional facility staff or law enforcement officials are able to monitor information requests and conduct further investigations if the resident status communication system detects suspicious activity, such as, for example, a request from a suspected co-conspirator. The resident status communication system records these requests and allows law enforcement officials to search these records based on the name or prisoner identification of the inmate.

FIG. 1 illustrates a block diagram of a resident status communication environment 100, according to exemplary embodiments. In an embodiment, resident status communication environment 100 includes a resident status communication system 110, a resident status database 120, network 130, non-resident communication devices 140A, 140B, . . . 140n, correctional facility reporting system 150, and law enforcement reporting system 160.

Resident status communication system 110 includes one or more processors, memory, servers, routers, modems, and/or antennae configured to interface with resident status database 120, network 130, non-resident communication devices 140A, 140B. 140n, correctional facility reporting system 150, and/or law enforcement reporting system 160. Resident status communication system 110 is a system that receives requests from non-resident communication devices 140 for information related to the operation or administration of a correctional facility and/or personal information related to an inmate. Non-resident communication devices 140 may be a phone, tablet, and/or computer. In an embodiment, non-resident communication devices 140 are equipped with telephony capabilities and request information via a phone call to resident status communication system 110. In an embodiment, non-resident communication devices 140 include display screens and communicate with resident status communication system 110 via a web browser or installed application.

To communicate with resident status communication system 110, non-resident communication devices 140 utilize network 130 and/or a network protocol to send and receive data over network 130. Network 130 is a network capable of transmitting information either in a wired or wireless manner and may be, for example, telephone cables or wiring, the Internet, a Local Area Network (LAN), or a Wide Area Network (WAN). The network protocol may be, for example, a hypertext transfer protocol (HTTP), a TCP/IP protocol, User Datagram Protocol (UDP), Ethernet, cellular, Bluetooth, an asynchronous transfer mode, Plain old telephone service (POTS), or Voice over IP (VoIP), to name just a few examples, or any combination thereof.

After receiving an initial request for information, such as via a phone call or web access request, resident status communication system 110 utilizes artificial intelligence and rules-based natural language processing algorithms to interact with the non-resident communication device 140 requesting information. For example, resident status communication system 110 utilizes an interactive voice response (IVR) system to communicate with the non-resident communication device 140. In an embodiment, if a non-resident communication device 140 initializes an information request via a web browser or an application, resident status communication system 110 generates a graphical user interface display allowing the resident status communication system 110 to submit data or information to resident status communications system 110. Communicating with non-resident communication device 140 via an IVR or graphical user interface design system allows for a more user-friendly method of requesting information from and/or providing information to non-resident communication device 140.

Figure 3:
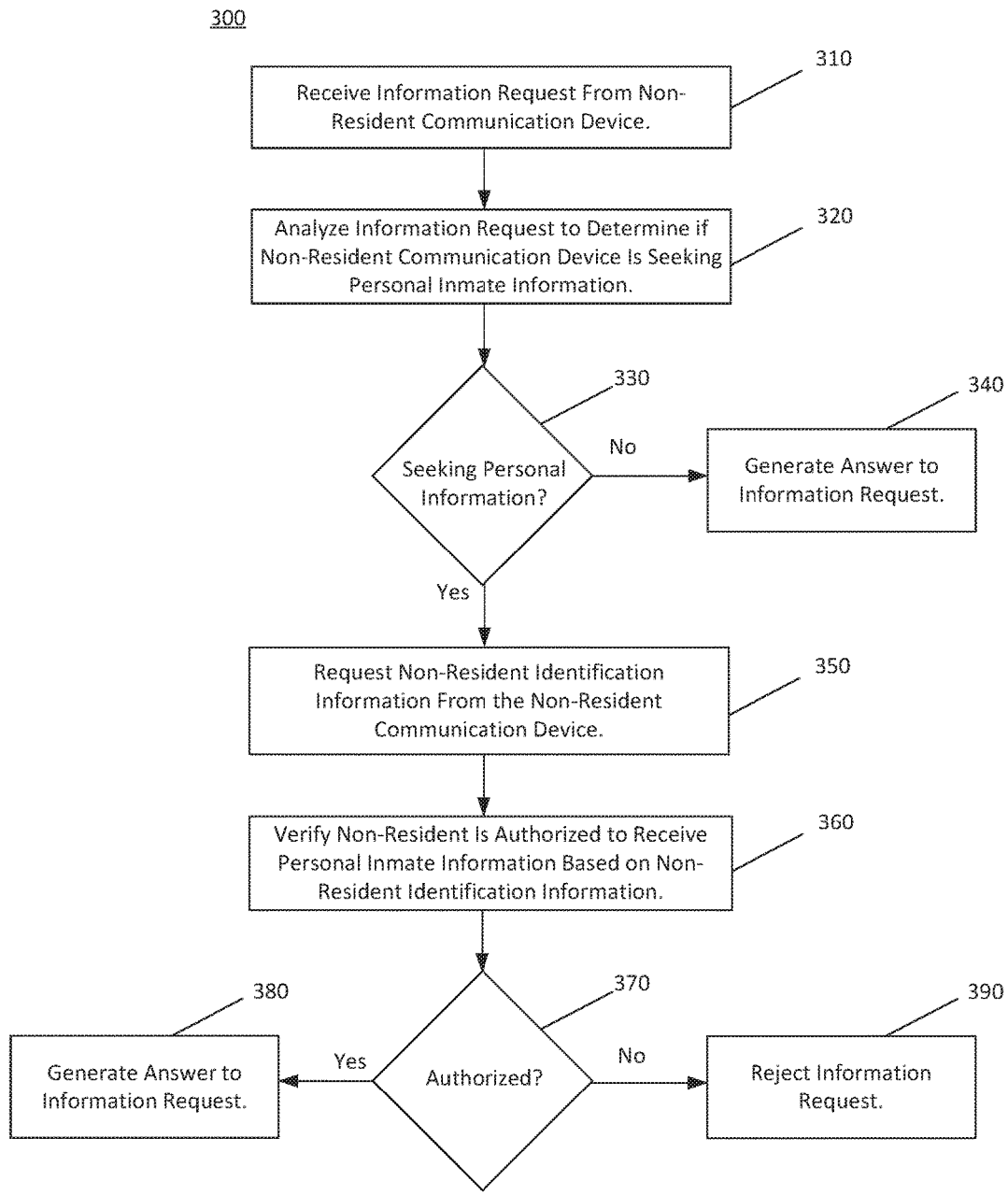
FIG. 3 illustrates a flowchart illustrating a method for identifying non-residents in a serial manner and reporting resident statuses, according to exemplary embodiments.
Figure 4:
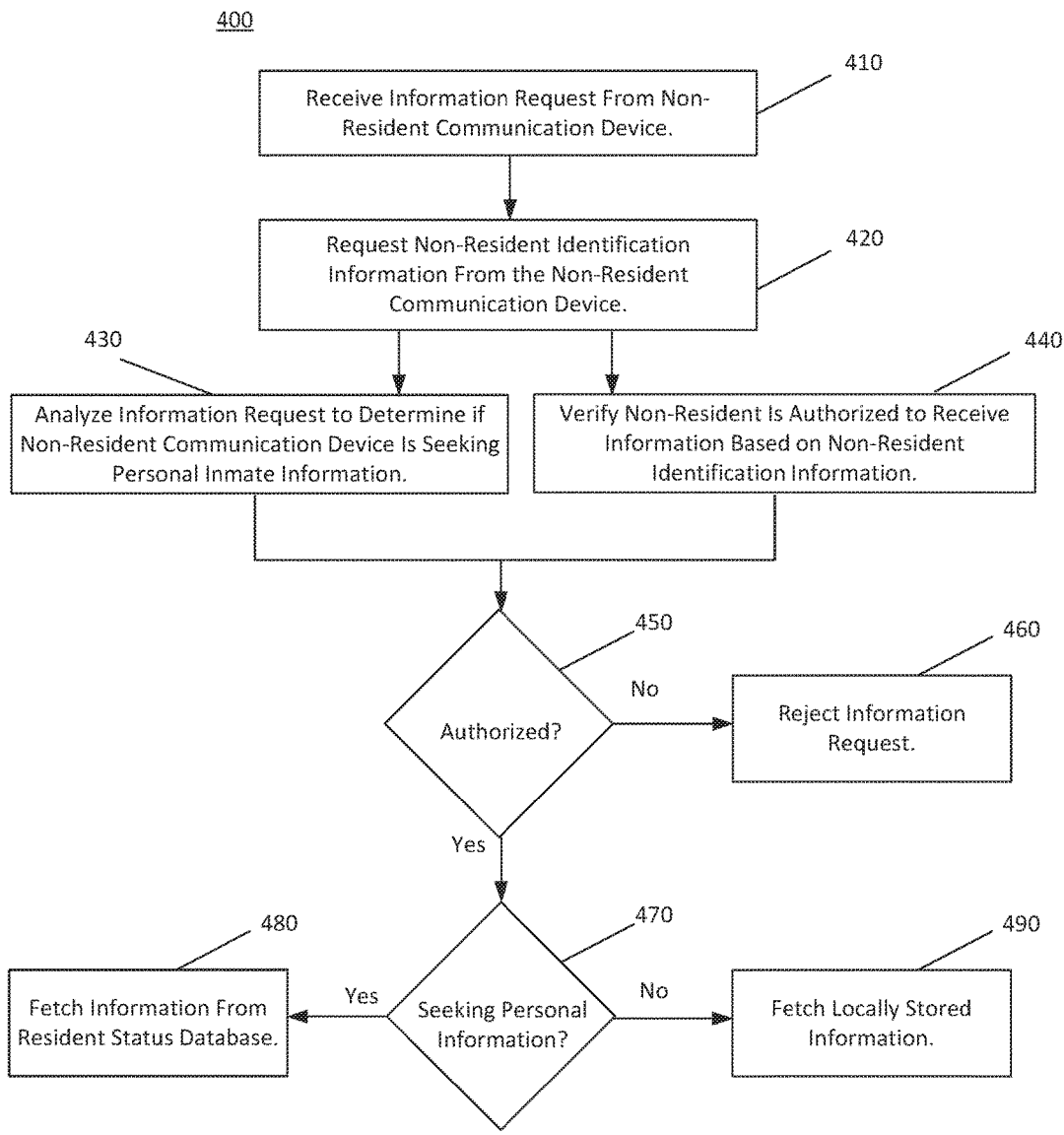
FIG. 4 illustrates a flowchart illustrating a method for identifying non-residents in a parallel manner and reporting resident statuses, according to exemplary embodiments.

In an embodiment, after initializing a channel of communication with a non-resident communication device 140 via network 130, resident status communication system 110 initializes an authorization procedure to determine the identity of the non-resident seeking information and/or to provide the information sought. Identifying, verifying, authenticating, and/or authorizing allows correctional facility staff or law enforcement officials to control the information provided by resident status communication system 110. For example, correctional facility staff may be legally obligated not to provide personal inmate information to the public but may be allowed to provide the information to family members. In an embodiment, to protect the inmate's privacy, resident status communication system 110 first authenticates the non-resident requesting the information. FIG. 3 and FIG. 4 illustrate embodiments of methods for authenticating and verifying individuals as well as providing requested information.

To authenticate a non-resident, resident status communication system 110 utilizes an IVR or graphical user interface design system to request non-resident identification information from the non-resident communication device 140 requesting inmate information. Non-resident identification information includes, for example, a name, birthday, residence address, relationship to the inmate, social security number, government identification number (e.g., driver's license), contact information, biometric data such as a voiceprint, fingerprint data, facial recognition data, and/or retina scanner data, and/or other information for identifying an individual.

After receiving the non-resident identification information, resident status communication system 110 authenticates the individual and determines whether the individual is authorized to receive information related to the inmate. In an embodiment, to verify the individual, resident status communication system 110 compares the received non-resident identification information to a list of approved individuals, such as a whitelist. Law enforcement officials and/or correctional facility staff may define this list. In an embodiment, resident status communication system 110 stores this list in an internal memory and/or an external memory, such as, for example, resident status database 120.

In an embodiment, resident status communication system 110 associates each inmate with a list of approved non-residents. When a non-resident communication device 140 submits an information request, the information request includes an inmate identifier, such as a name and/or prisoner identification number. After receiving the information request, resident status communication system 110 identifies the particular inmate associated with the received information request. Resident status communication system 110 then utilizes a list of approved non-residents associated with the particular inmate to determine if the non-resident requesting the information is authorized to receive the information.

Resident status communication system 110 searches the list associated with the inmate to determine if the provided non-resident identification information matches information stored on the list. The information stored on the list includes, for example, a name, birthday, residence address, relationship to the inmate, social security number, government identification number (e.g., driver's license), contact information, biometric data such as a voiceprint, fingerprint data, facial recognition data, and/or retina scanner data, and/or other information for identifying an individual. For example, in an embodiment, resident status communications system 110 compares a provided name and/or social security number in the non-resident identification information to the names and associated social security numbers included on the list. If the provided name and social security number matches a listed name and social security number, then resident status communication system 110 confirms the identity of the non-resident as being an approved individual. Resident status communication system 110 notes that the approved individual may receive information related to the inmate. In an embodiment, to generate the list, resident status communications system 110 communicates with a third party database (such as a governmental agency database) to confirm provided non-resident information.

In an embodiment, the non-resident has completed a registration process in the past and resident status communication system 110 verifies the provided non-resident identification information against this registered information. For example, the non-resident may create an account and/or provide biometric data to be saved. If approved, resident status communications system 110 may utilize this biometric data in future access attempts to verify the identity of the non-resident. To verify the identity of the non-resident, the provided non-resident identification information includes biometric data and the biometric data is compared to other stored biometric data in the list associated with the inmate. Resident status communication system 110 identifies the non-resident as approved if a match in biometric data is found in a search of the list. In an embodiment, resident status communication system 110 stores lists and associated inmate information in memory internal to resident status communication system.

In an embodiment, resident status database 120 stores the lists of approved individuals associated with inmates. Resident status database 120 is memory external to resident status communication system 110. In an embodiment, resident status database 120 maintains statuses and personal information related to the inmates. After resident status communication system 110 verifies that an non-resident is authorized to access personal information related to an inmate, resident status communication system 110 retrieves the personal information from resident status database 120. Personal information or inmate status includes, for example, the offense for which the inmate is charged, offenses committed by an inmate while residing at a correctional facility (e.g., violence or disruption), whether the inmate has visited the infirmary including dates or reason for visit, if the inmate has borrowed books including the titles, quantity, or duration of rental, if the inmate has borrowed an electronic device such as a tablet or computer including the applications or content accessed (e.g., websites, movies, music, video games) and duration of rental, other recreational activities, the amount of money in an inmate account, such as a commissary account, items purchased using a commissary account, and/or relevant court dates/times, parole hearing dates/times, or release date/times.

Correctional facility staff and/or law enforcement officials are able to update the information stored in resident status database 120. In an embodiment, correctional facility staff utilizes a correctional facility reporting system 150. Correctional facility reporting system 150 may be a phone, tablet, laptop computer, and/or desktop computer capable of communicating with resident status communication system 110 and/or resident status database 120. Correctional facility reporting system 150 may be wired to communicate with resident status communication system 110. In an embodiment, resident status communications system 110 is located remote from correctional facility reporting system 150 and, correctional facility reporting system 150 communicates with resident status communication system 110 via network 130. For example, correctional facility reporting system 150 may utilize an application installed on correctional facility reporting system 150 to communicate or may utilize an Internet browser to communicate.

In an embodiment, law enforcement officials utilize law enforcement reporting system 160. Law enforcement reporting system 160 may be a phone, tablet, laptop computer, and/or desktop computer capable of communicating with resident status communication system 110 and/or resident status database 120. Law enforcement reporting system 160 may be wired to communicate with resident status communication system 110. In an embodiment, resident status communications system 110 is located remote from law enforcement reporting system 160 and, law enforcement reporting system 160 communicates with resident status communication system 110 via network 130. For example, law enforcement reporting system 160 may utilize an application installed on law enforcement reporting system 160 to communicate or may utilize an Internet browser to communicate.

Utilizing correctional facility reporting system 150 or law enforcement reporting system 160, correctional facility staff and/or law enforcement officials are able to update the information stored in resident status database 120. In an embodiment, correctional facility reporting system 150 and law enforcement reporting system 160 access and edit records stored in resident status database 120 representing personal information related to an inmate. For example, if a hearing date for the inmate has changed, law enforcement reporting system 160 is able to transmit data to resident status database 120 to update the record stored in resident status database 120. When an authorized non-resident communication device 140 attempts to access this information, resident status communication system 110 is able to retrieve the updated hearing date and return the date to the non-resident communication device.

In an embodiment, to provide updated status information correctional facility reporting system 150 and/or law enforcement reporting system 160 communicate with resident status communication system 110 to store new information in resident status database 120. Resident status communication system 110 and resident status database 120 also allow for correctional facility reporting system 150 and law enforcement reporting system 160 to share information regarding inmates such that correctional facility staff is informed of issues related to non-incarcerated individuals and so that law enforcement officials are informed about inmate statuses from within a correctional facility.

In an embodiment, resident status communication system 110 can interface with existing hardware at a correctional facility or can be adapted to receive phone calls to a phone number associated with the correctional facility. Resident status communication system 110 also stores information related to the administration or operation of the correctional facility. In an embodiment, resident status database 120 stores this information. Based on the requested information from a non-resident communication device 140, resident status communication system 110 is able to report information related to the administration or operation of the correctional facility.

In an embodiment, if a non-resident communication device is requesting information about the correctional facility rather than personal information related to an inmate, resident status communication system 110 requires a less stringent requirement for authentication. For example, resident status communication system 110 only requires a name rather than a name and a social security number. In an embodiment, resident status communication system 110 does not require authentication if non-personal information is requested, delivering information to the public if the information is not confidential.

For example, if the requested information relates to the cost of a phone call with an inmate, how to deposit funds into an inmate account, the visitation hours and visitation rules of the correctional facility, available methods of communications with inmates generally, how to deliver a letter or package to an inmate, the cost of an item at a prison commissary, and/or other information related to the administration or operation of the correctional facility, resident status communication system 110 will provide this information without requiring the level of authentication and security needed to access personal inmate information.

In an embodiment, however, a correctional facility may choose not to publicly disseminate this information or portions of this information to maintain confidentiality and/or reduce threats to security. Using correctional facility reporting system 150, correctional facility staff is able to adjust rules related to authentication and authorization and specify which types of information require which levels of authorization. With this customization, correctional facility staff are able to generate a spectrum of information ranging from information available to the public to confidential information that only certain individuals may access. In an embodiment, different types of identification information may be define. In an embodiment, the type of identification information required is based on the inmate. For example, a first inmate may require biometric data to access personal information related to the first inmate while a second inmate may require a social security number to access personal information related to the second inmate. In an embodiment, resident status communication system 110 determines the type of information required based on the level of confidentiality associated with the inmate and/or the information sought. In an embodiment, resident status communication system 110 determines the type of information required based on the crime with which the inmate is charged.

After determining that a non-resident is authorized to access personal information related to an inmate and/or information related to correctional facility administration and operation, resident status communication system 110 transmits this information to the non-resident communication device 140 requesting the information via network 130. In an embodiment, the resident status communication system 110 delivers the requested information using an IVR system. For example, residents status communication system 110 authenticates the non-resident using non-resident communication device 140 using the IVR system and returns requested information using the same IVR system. In an embodiment, a computer-generated voice relays the information to non-resident communication device 140. The computer-generated voice then prompts the non-resident communication device 140 to provide any additional information requests. These information requests may be verbal, and resident status communication system 110 is able to analyze and process these requests using speech recognition algorithms, artificial intelligence, and machine learning to identify the inquiry and relevant information.

In an embodiment, resident status communication system 110 communicates with non-resident communication device 140 via an application installed on non-resident communication device 140 and/or a website or Internet browser. In an embodiment, resident status communication system 110 is able to interface with different non-resident communication devices 140 communicating via different means with resident status communication system 110 and provide corresponding answers. For example, resident status communication system 110 is able to maintain a phone call with non-resident communication device 140A while maintaining a textual chat exchange with non-resident communication device 140B.

As information is requested and/or retrieved, resident status communication system 110 is able to monitor and/or generate a record of non-resident communication device 140 interactions with resident status communication system 110. For example, resident status communication system 110 logs information requested as well as information presented. In an embodiment, resident status communication system 110 stores a record of the request and provided identification data against metadata related to the first communication device, such as, for example, an IP address and/or caller ID information. Using these records, correctional facility staff or law enforcement officials are able to utilize resident status communication system 110 and determine if suspicious activity is occurring.

In an embodiment, resident status communication system 110 also implements a monetization scheme for providing information to non-resident communication devices 140. For example, to access personal inmate information, resident status communication system 110 may charge an account and/or credit card before supplying the requested information. Resident status communication system 110 may charge based on the information sought or grant access to information for a one-time fee. In an embodiment, even with the monetization system, resident status communication system 110 will still first authenticate a non-resident communication device 140 prior to supplying requested information.

Figure 2:
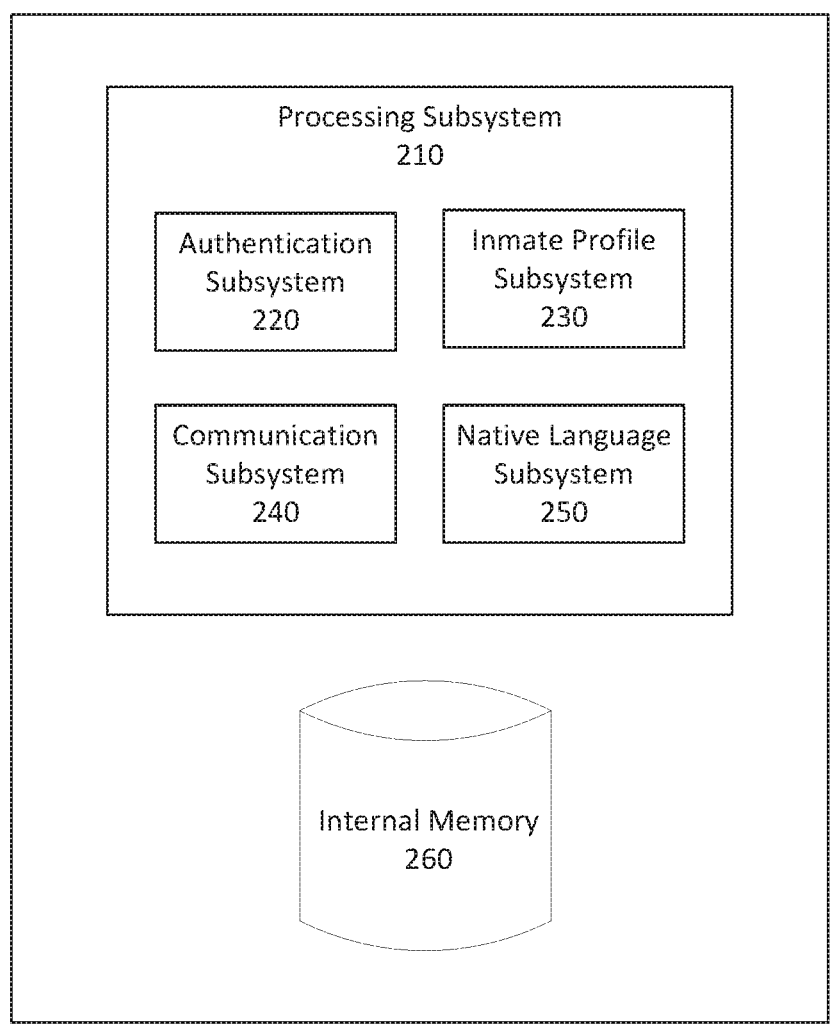
FIG. 2 illustrates a block diagram of a resident status communication system, according to exemplary embodiments.

FIG. 2 illustrates a block diagram of a resident status communication system 200, according to exemplary embodiments. In an embodiment, resident status communication system 200 operates in a manner similar to resident status communication system 110 as described with reference to FIG. 1. Resident status communication system 200 includes but is not limited to processing subsystem 210 and internal memory 260. Processing subsystem 210 includes one or more processors, computers, or servers identified as subsystems and can be constructed as individual physical hardware devices, or as virtual devices, such as a virtual server. The number of processing subsystems 210 can be scaled to match the number of simultaneous user connections desired to be supported by a resident status communication system such as resident status communication system 110 of FIG. 1. Processing subsystem 210 includes but is not limited to authentication subsystem 220, inmate profile subsystem 230, communication subsystem 240, and native language subsystem 250.

In some embodiments, communication subsystem 240 controls the routing of communications including voice data and/or Internet browser exchanges between resident status communication system 110 and non-resident communication devices 140. Communication subsystem 240 also controls the routing of communications exchanged with resident status database 120, correctional facility reporting system 150, and law enforcement reporting system 160. Communication subsystem 240 also routes data from non-resident communication device 140 to the appropriate subsystems within resident status communication system 200 for processing of the data. For example, communication system routes voice data received from a non-resident communication device 140 to native language subsystem 250. In an embodiment, communication subsystem 240 communicates with correctional facility reporting system 150 and/or law enforcement reporting system 160 to receive updates related to inmate profile information stored on resident status database 120 and/or internal memory 260. Internal memory 260 may be a hard disk drive, solid state drive, database, and/or other data repository. Communication subsystem 240 routes updates to inmate profile subsystem 230 to process the updates. Communication system 240 also retrieves requested information and delivers the requested information external to resident status communication system 200.

In an embodiment, authentication subsystem 220 performs authentication functions for authenticating non-resident communication devices 140. Authentication subsystem 220 receives non-resident identification information from non-residents utilizing non-resident communication devices 140. Non-resident identification information includes, for example, a name, birthday, residence address, relationship to the inmate, social security number, government identification number (e.g., driver's license), contact information, biometric data such as a voiceprint, fingerprint data, facial recognition data, and/or retina scanner data, and/or other information for identifying an individual. Non-resident identification information can also include but is not limited to at least one of a username and password data, challenge questions, challenge answers, device data such as make and model of a communication device, and/or location data related to the non-resident communication device 140. Biometric data includes one or more of a finger print, a hand print, a voice sample, an iris or retinal sample, a facial image of the user (2D or 3D), a gait identification, a hand geometry, a signature identification, an infrared camera identification, or any other biometric as deemed appropriate. Authentication subsystem 220 has biometric capabilities and analyzes voice data to determine the identities of parties in the voice data. Authentication subsystem 220 then is able to determine whether the identified parties are allowed to request personal inmate information. Authentication subsystem 220 further assists in establishing a secure communication between non-resident communication devices 140 and resident status communication system 200.

In an embodiment, authentication subsystem 220 maintains rules for determining a level of authentication required for allowing a non-resident communication device to access personal inmate data. For example, authentication subsystem 220 may require a non-resident communication device 140 to provide a name and social security number before authorizing the non-resident. Authentication subsystem 220 also performs the check of received identification data with lists of approved individuals maintained by inmate profile subsystem 230.

Authentication subsystem 220 also generates notifications and alerts to correctional facility staff and/or law enforcement agents. These notifications may be transmitted from resident status communication system 200 to correctional facility reporting system 150 and/or law enforcement reporting system 160. For example, authentication subsystem 220 triggers a notification when a particular non-resident communication device 140 has initiated a large volume of information requests.

Authentication subsystem 220 interfaces with inmate profile subsystem 230 after authenticating a non-resident communication device 140 and authorizing the non-resident communication device 140 to receive requested information. If the non-resident communication device 140 is requesting personal information related to an inmate, inmate profile subsystem 230 retrieves the requested personal information. Inmate profile subsystem 230 retrieves the information from resident status database 120 and/or internal memory 260. In an embodiment, resident status database 120 may store the inmate information external to resident status communication system 200 because the inmate profile information is confidential or securely maintained by correctional facility staff and/or law enforcement officials. Inmate profile subsystem 230 is able to generate the proper requests and/or utilize the proper database protocols to fetch the requested information.

In an embodiment, if a portion of requested information is stored in resident status database 120 and a portion of the requested information is stored in internal memory 260, inmate profile subsystem 230 is able to access both memory repositories and package the information to be transmitted to the requesting non-resident communication device 140. For example, inmate profile subsystem 230 is able to handle a request for information that requires information from both memories and/or is able to handle two requests that require information from one memory and then the other memory.

For example, in an embodiment, a non-resident communication device 140 may first request the visiting hours of the correctional facility. The general visiting hours are stored in internal memory 260. Inmate profile subsystem 230 retrieves this information from internal memory 260 to be delivered to the requesting non-resident communication device 140. In a subsequent request, the non-resident communication device 140 requests the specific times that a particular inmate is available for visitation. This information may be stored in resident status database 120. Inmate profile subsystem 230 recognizes the location of information storage and queries resident status database 120 for this specific information. In an embodiment, internal memory 260 creates local copies and/or mirrors of resident status database 120. In an embodiment, inmate profile subsystem 230 periodically copies residents status database 120 and/or updates internal memory 260 when resident status database 120 is updated. In an embodiment, resident status database 120 notifies resident status communication system 200 of updates provided by correctional facility staff and/or law enforcement officials.

After retrieving requested information from internal memory 260 or resident status database 120, inmate profile subsystem 230 passes the information to native language subsystem 250. Native language subsystem 250 converts the requested information into natural language to present to non-resident communication device 140. In an embodiment, native language subsystem 250 utilizes natural language processing algorithms to select appropriate words, syntax, semantics, and grammar to package the requested information. If non-resident communication device 140 is communicating with resident status communication system 200 via a phone call, native language subsystem 250 synthesizes a computer-generated voice to respond to non-resident communication device 140. If non-resident communication device 140 is communication with resident status communication system 200 via a web browser or in a textual form, native language subsystem 250 generates a textual message, such as an email or chat message, that is sent to non-resident communication device 140.

In addition to generating response to information requests, native language subsystem 250 also receives the information requests and parses the information requests to determine the information requested. For example, native language subsystem 250 utilizes speech-to-text algorithms to convert audio data to textual data. Authentication subsystem 220 and inmate profile subsystem 230 are then able to utilize this textual data to perform keyword comparisons to authenticate a non-resident communication device and/or to perform keyword comparisons to identify the type of information sought.

FIG. 3 illustrates a flowchart illustrating a method 300 for identifying non-residents in a serial manner and reporting resident statuses, according to exemplary embodiments. Method 300 shall be described with reference to FIG. 1; however, method 300 is not limited to that example embodiment.

In an embodiment, resident status communication system 110 utilizes method 300 to authenticate non-residents, determine the information requested by the non-resident, and/or supply the information requested. The foregoing description will describe an embodiment of the execution of method 300 with respect to resident status communication system 110. While method 300 is described with reference to resident status communication system 110, method 300 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

In an embodiment, at 310, resident status communication system 110 receives an information request from a non-resident communication device 140. The information request includes a question concerning operational or administrative procedures of a correctional facility and/or a request for personal information related to an inmate. In an embodiment, the information request also includes an inmate identification, such as an inmate name or prison identification number. In an embodiment, the information request is a voice call initiated by a non-resident communication device 140. The information requested may take the form of a question and/or a statement. In an embodiment, the information request is provided in response to a greeting and/or a computer-generated voice prompt initialized by resident status communication system 110.

In an embodiment, the information request also includes a selection from a menu using a dial-tone keypad, such as a dual-tone multi-frequency signaling (DTMF) protocol. If the resident status communication system 110 is interacting with the non-resident communication device 140 via a textual communication such as an Internet browser or application, the information request is a textual question and/or selection. For example, resident status communication system 110 generates chat graphical user interface display and sends instructions to non-resident communication device 140 to display the graphical user interface on a display screen. A non-resident is then able to interact with the graphical user interface and supply information requests to resident status communication system 110 using textual messages.

In an embodiment, non-resident communication device 140 may supply an incomplete and/or indiscernible information request to resident status communication system 110. For example, resident status communication system 110 may receive a partial question, partial identification, and/or nonsense words that do not specify what information is requested. Resident status communication system 110 identifies incomplete and/or indiscernible information requests using natural language speech to text and/or textual analysis algorithms. In these cases, resident status communication system 110 alerts the non-resident communication device 140 that the information request was unclear and/or prompts the non-resident communication device 140 to submit another information request.

At 320, if resident status communication system 110 receives a complete information request, resident status communication system 110 analyzes the information request to determine if the non-resident communication device is seeking personal inmate information. In an embodiment, resident status communication system 110 converts an audio information request into textual information and scans the textual information for keywords related to personal information. For example, resident status communication system 110 utilizes a predefined list of keywords to identify personal information sought. If one or more of the words spoken in the information request matches a keyword from the predefined list, resident status communication system 110 recognizes that non-resident communication system 110 is seeking personal inmate information. Similarly, if the received information request is in a textual form, resident status communication system 110 identifies keywords in the text information. At 330, based on an analysis of the information request, resident status communication system 110 determines whether personal information is sought.

At 340, if resident status communication system 110 determines that the information request is not seeking personal information, resident status communication system 110 generates an answer to the information request. For example, resident status communication system 110 fetches the desired information from resident status database 120 and/or memory internal to resident status communication system 110. Resident status communication system 110 packages the retrieved information in a format accessible by the non-resident communication device. For example, resident status communication system 110 delivers the information using a computer-generated voice if the non-resident communication device 140 initiated a phone call with the resident status communication system 110. Resident status communication system 110 delivers the information using textual information if the information requests as a textual request submitted via an application and/or an Internet browser. In an embodiment, resident status communication system 110 is able to interface with different non-resident communication devices 140 communicating via different means with resident status communication system 110 and provide corresponding answers. For example, resident status communication system 110 is able to maintain a phone call with non-resident communication device 140A while maintaining a textual chat exchange with non-resident communication device 140B.

At 350, if resident status communication system 110 determines that the information request includes a request for personal inmate information, resident status communication system 110 requests non-resident identification information from the non-resident communication device 140. If the non-resident communication device 140 has already supplied identification information at 310, resident status communication system 110 will utilize the provided identification information in verifying the non-resident. At 350, if resident status communication system determines that the provided identification information is insufficient, resident status communication system 110 will requests additional identification information. For example, if the non-resident provided a name at 310 but in order to access personal inmate information, the non-resident's birthday is required, resident status communication system 110 will request the birthday information at 350.

Using the non-resident identification information, resident status communication system 110 is able to verify whether the non-resident is authorized to receive personal inmate information at 360. Based on the level of authentication defined by a law enforcement official and/or correctional facility staff, at 360, resident status communication system 110 determines if the supplied non-resident identification information is sufficient.

In an embodiment, resident status communication system 110 determines sufficiency based on whether the requested identification information matches stored identification information. For example, resident status communication system 110 may request a name and associated social security number. If the provided name and social security number do not match the stored information, resident status communication system 110 determines that the non-resident is not authorized at 370. Similarly, if the non-resident fails to provide a response or fails to provide a response within a predetermined period of time, resident status communication system 110 determines that the non-resident is not authorized at 370.

In an embodiment, resident status communication system 110 determines authorization in a determinative manner. That is, resident status communication system 110 will request specific identification information at 350. To be authorized, non-resident communication device 140 must supply the requested identification information, and the supplied identification information must match the information stored in resident status communication system 110 and/or resident status database 120. In this manner, resident status communication system 110 may randomize and/or select different requirements of identification information to enhance security.

In an embodiment, resident status communication system 110 allows the non-resident to supply multiple types of verification information. Resident status communication system 110 will authenticate a non-resident based on the quantity of matching information supplied. For example, if the amount of matching information exceeds a predefined threshold, resident status communication system 110 authorizes the non-resident at 370. In an embodiment, if provided information does not match, resident status communication system 110 may weigh the amount of information that matches with the information that does not match and generate a verification score. If the verification score exceeds a threshold, resident status communication system 110 authorizes the user. Using multiple types of verification information allows for more flexibility in authenticating a non-resident that is seeking information.

In an embodiment, resident status communication system 110 utilizes a combination of a determinative authorization process as well as a flexible process to achieve a balance in security. For example, resident status communication system 110 may require that a social security number provided matches a social security name stored on a white list of approved non-residents. The resident status communication system 110 then prompts the non-resident communication device to provide secondary identification information, allowing the non-resident to select from, for example, a birthday, driver's license number, or home address. If the selected secondary identification information matches stored information, resident status communication system 110 authorizes the non-resident at 370.

At 380, if resident status communication system 110 authorizes the non-resident, resident status communication system 110 generates an answer to the information request. Similarly to the process described at 340, resident status communication system 110 retrieves the requested personal inmate information and packages the information in a manner accessible on the non-resident communication device 140. Resident status communication system 110 may also prompt non-resident communication device 140 to submit another information request and/or continue to execute method 300 until resident status communication system 110 disconnects from non-resident communication device 140. Similar to 340, at 380, resident status communication system 110 also logs the request for information as well as the answer. In an embodiment, resident status communication system 110 generates a record of communications between resident status communication system 110 and non-resident communication device 140. This logging allows for future investigations into suspicious requests and/or allows resident status communication system 110 to generate an alert when suspicious activity, such as, for example, multiple failed attempts at authorization, are detected. Resident status communication system 110 records these requests and allows law enforcement officials to search these records based on the name or prisoner identification of the inmate.

At 390, if resident status communication system 110 does not authorize the non-resident, resident status communication system 110 rejects the information request. In an embodiment, resident status communication system 110 allows the non-resident to attempt to re-authenticate and to supply new identification information to be registered. In an embodiment, if resident status communication system 110 rejects an information requests a predetermined number of times, resident status communication system 110 locks-out the particular non-resident communication device 140 attempting to access inmate personal information. For example, using caller ID or IP address monitoring, resident status communication system 110 blocks non-resident communication devices 140 based on the phone number and/or IP address utilized to access resident status communication system 110.

In an embodiment described with reference to method 300, if the non-resident is not seeking personal information as determined at 330, resident status communication system 110 generates an answer to the information request at 340. For example, resident status communication system 110 generates an answer if a non-resident is seeking information related to correctional facility administration or operations or general correctional facility information. In this embodiment, resident status communication system 110 need not request identification information from the non-resident communication device 140. When requesting general information that is not associated with a particular inmate, in an embodiment, resident status communication system 110 provides the information without additional verification of non-resident identity. This embodiment contrasts the embodiment described with respect to FIG. 4, which requests identification information even if the information sought is general in nature.

FIG. 4 illustrates a flowchart illustrating a method 400 for identifying non-residents in a parallel manner and reporting resident statuses, according to exemplary embodiments. Method 400 shall be described with reference to FIG. 1; however, method 400 is not limited to that example embodiment.

In an embodiment, resident status communication system 110 utilizes method 400 to authenticate non-residents, determine the information requested by the non-resident, and/or supply the information requested. The foregoing description will describe an embodiment of the execution of method 400 with respect to resident status communication system 110. While method 400 is described with reference to resident status communication system 110, method 400 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

In an embodiment, at 410, resident status communication system 110 receives an information request from a non-resident communication device 140. The information request includes a question concerning operational or administrative procedures of a correctional facility and/or a request for personal information related to an inmate. In an embodiment, the information request also includes an inmate identification, such as an inmate name or prison identification number. In an embodiment, the information request is a voice call initiated by a non-resident communication device 140. The information requested may take the form of a question and/or a statement. In an embodiment, the information request is provided in response to a greeting and/or a computer-generated voice prompt initialized by resident status communication system 110.

In an embodiment, the information request also includes a selection from a menu using a dial-tone keypad, such as a dual-tone multi-frequency signaling (DTMF) protocol. If the resident status communication system 110 is interacting with the non-resident communication device 140 via a textual communication such as an Internet browser or application, the information request is a textual question and/or selection. For example, resident status communication system 110 generates chat graphical user interface display and sends instructions to non-resident communication device 140 to display the graphical user interface on a display screen. A non-resident is then able to interact with the graphical user interface and supply information requests to resident status communication system 110 using textual messages.

In an embodiment, non-resident communication device 140 may supply an incomplete and/or indiscernible information request to resident status communication system 110. For example, resident status communication system 110 may receive a partial question, partial identification, and/or nonsense words that do not specify what information is requested. Resident status communication system 110 identifies incomplete and/or indiscernible information requests using natural language speech to text and/or textual analysis algorithms. In these cases, resident status communication system 110 alerts the non-resident communication device 140 that the information request was unclear and/or prompts the non-resident communication device 140 to submit another information request.

At 420, if resident status communication system 110 determines that the information request includes a complete request for information, resident status communication system 110 requests non-resident identification information from the non-resident communication device 140. If the non-resident communication device 140 has already supplied identification information at 410, resident status communication system 110 will utilize the provided identification information in verifying the non-resident. At 420, if resident status communication system determines that the provided identification information is insufficient, resident status communication system 110 will requests additional identification information. For example, if the non-resident provided a name at 410 but in order to access personal inmate or correctional facility information, the non-resident's birthday is required, resident status communication system 110 will request the birthday information at 420.

In an embodiment, to execute method 400, resident status communication system 110 requests non-resident identification information at 420 independent of the type of information sought by non-resident communication device 140. In this embodiment, resident status communication system 110 protects personal inmate information as well as general operational and administrative details related to a correctional facility against unauthorized non-residents. In an embodiment, law enforcement officials and/or correctional facility staff may define multiple authorization policies in resident status communication system 110. Based on a common authorization process at 420, resident status communication system 110 may receive required information and determine whether a user is authorized to access personal inmate information and/or administrative or operational details related to the correctional facility.

After requesting non-resident identification information at 420, resident status communication system 110 analyzes the information request to determine if the non-resident communication device is seeking personal inmate information at 430 and verifies that the non-resident is authorized to receive information based on the non-resident identification information at 440. In an embodiment, this processes occur simultaneously and/or in parallel. In an embodiment, these processes occur serially.

At 430, if resident status communication system 110 receives a complete information request, resident status communication system 110 analyzes the information request to determine if the non-resident communication device is seeking personal inmate information. In an embodiment, resident status communication system 110 converts an audio information request into textual information and scans the textual information for keywords related to personal information. For example, resident status communication system 110 utilizes a predefined list of keywords to identify personal information sought. If one or more of the words spoken in the information request matches a keyword from the predefined list, resident status communication system 110 recognizes that non-resident communication system 110 is seeking personal inmate information. Similarly, if the received information request is in a textual form, resident status communication system 110 identifies keywords in the text information. At 470, based on an analysis of the information request, resident status communication system 110 determines whether personal information is sought.

At 440, using the non-resident identification information, resident status communication system 110 is able to verify whether the non-resident is authorized to receive correctional facility and/or personal inmate information. Based on the level of authentication defined by a law enforcement official and/or correctional facility staff, at 420, resident status communication system 110 determines if the supplied non-resident identification information is sufficient.

In an embodiment, resident status communication system 110 determines sufficiency based on whether the requested identification information matches stored identification information. For example, resident status communication system 110 may request a name and associated social security number. If the provided name and social security number do not match the stored information, resident status communication system 110 determines that the non-resident is not authorized at 450. Similarly, if the non-resident fails to provide a response or fails to provide a response within a predetermined period of time, resident status communication system 110 determines that the non-resident is not authorized at 450.

In an embodiment, resident status communication system 110 determines authorization in a determinative manner. That is, resident status communication system 110 will request specific identification information at 420. To be authorized, non-resident communication device 140 must supply the requested identification information, and the supplied identification information must match the information stored in resident status communication system 110 and/or resident status database 120. In this manner, resident status communication system 110 may randomize and/or select different requirements of identification information to enhance security.

In an embodiment, resident status communication system 110 allows the non-resident to supply multiple types of verification information. Resident status communication system 110 will authenticate a non-resident based on the quantity of matching information supplied. For example, if the amount of matching information exceeds a predefined threshold, resident status communication system 110 authorizes the non-resident at 450. In an embodiment, if provided information does not match, resident status communication system 110 may weigh the amount of information that matches with the information that does not match and generate a verification score. If the verification score exceeds a threshold, resident status communication system 110 authorizes the user. Using multiple types of verification information allows for more flexibility in authenticating a non-resident that is seeking information.

In an embodiment, resident status communication system 110 utilizes a combination of a determinative authorization process as well as a flexible process to achieve a balance in security. For example, resident status communication system 110 may require that a social security number provided matches a social security name stored on a white list of approved non-residents. The resident status communication system 110 then prompts the non-resident communication device to provide secondary identification information, allowing the non-resident to select from, for example, a birthday, driver's license number, or home address. If the selected secondary identification information matches stored information, resident status communication system 110 authorizes the non-resident at 450.

In an embodiment, at 450, if resident status communication system 110 does not authorize the non-resident, resident status communication system 110 rejects the information request at 460. In an embodiment, resident status communication system 110 allows the non-resident to attempt to re-authenticate and to supply new identification information to be registered. In an embodiment, if resident status communication system 110 rejects an information requests a predetermined number of times, resident status communication system 110 locks-out the particular non-resident communication device 140 attempting to access inmate personal information. For example, using caller ID or IP address monitoring, resident status communication system 110 blocks non-resident communication devices 140 based on the phone number and/or IP address utilized to access resident status communication system 110.

At 470, if resident status communication system 110 authorizes the non-resident, resident status communication system 110 determines if the information request seeks personal inmate information as described with reference to 430.

At 490, if resident status communication system 110 determines that the information request is not seeking personal information, resident status communication system 110 fetches locally stored information. Resident status communication system 110 utilizes the locally stored information to generate an answer to the information request. In an embodiment, resident status communication system 110 stores information related to correctional facility operations and/or administration in memory internal to resident status communication system 110. This embodiment allows for faster retrieval of information. When interfacing with multiple non-resident communication devices 140, resident status communication system 110 is able to query internal memory to quickly service information requests related to general correctional facility operations. Additionally, if correctional facility staff maintains a resident status database separate from resident status communication system 110, querying the remote resident status database 120 may require a large amount of time. Similarly, if resident status database 120 is a database that correctional facility staff are modifying or that is access by multiple servers, fetching results may require waiting and/or queuing while other processes are completed. If resident status communication system 110 is able to store general information in internal memory, answers to information requests accessing this information may be generated in a faster manner than waiting to query an external resident status database 120.

After fetching locally stored information 490, resident status communication system 110 packages the retrieved information in a format accessible by the non-resident communication device. For example, resident status communication system 110 delivers the information using a computer-generated voice if the non-resident communication device 140 initiated a phone call with the resident status communication system 110. Resident status communication system 110 delivers the information using textual information if the information requests as a textual request submitted via an application and/or an Internet browser. In an embodiment, resident status communication system 110 is able to interface with different non-resident communication devices 140 communicating via different means with resident status communication system 110 and provide corresponding answers. For example, resident status communication system 110 is able to maintain a phone call with non-resident communication device 140A while maintaining a textual chat exchange with non-resident communication device 140B.

At 480, if resident status communication system 110 determines at 430 that the information request includes a request for personal inmate information, resident status communication system 110 fetches the personal inmate information from resident status database 120. As described above, resident status database 120 may be a database maintained and/or operated by correctional facility staff and/or law enforcement officials. Correctional facility staff and/or law enforcement officials utilize resident status database 120 to maintain information and status updates regarding inmates. Resident status communication system 110 is able to query the resident status database 120 for this information once a user is authenticated. Resident status communication system 110 packages the answer similar to the manner described with reference to 490.

After supplying answers are 480 or 490, resident status communication system 110 may also prompt non-resident communication device 140 to submit another information request and/or continue to execute method 400 until resident status communication system 110 disconnects from non-resident communication device 140.

Resident status communication system 110 also logs the request for information as well as the answers fetched and/or provided at 480 and/or 490. In an embodiment, resident status communication system 110 generates a record of communications between resident status communication system 110 and non-resident communication device 140. This logging allows for future investigations into suspicious requests and/or allows resident status communication system 110 to generate an alert when suspicious activity, such as, for example, multiple failed attempts at authorization, are detected.

Figure 5:
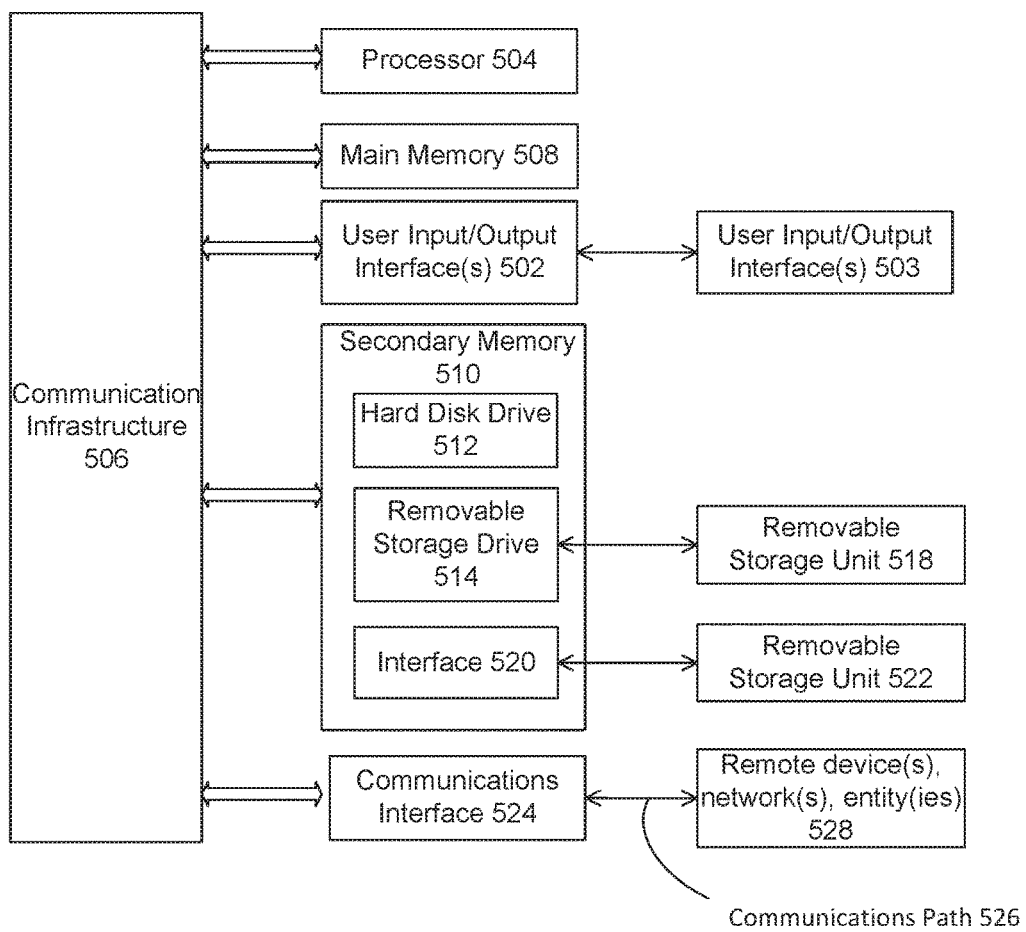
FIG. 5 illustrates an example computer system useful for implementing various embodiments.

Referring now to FIG. 5, various embodiments may be implemented, for example, using one or more computer systems, such as computer system 500 shown in FIG. 5. One or more computer systems 500 (or portions thereof) can be used, for example, to implement method 300 of FIG. 3 or method 400 of FIG. 4.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 406 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communication path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 5. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A method, comprising:
    receiving a first information request from a communication device;
    identifying a first keyword related to correctional facility operations from the first information request to determine that the first information request seeks correctional facility operational information;
    determining, based on the first keyword, that transmission of the correctional facility operational information is permitted without an authorization check of the communication device;
    fetching the correctional facility operational information from a first memory in response to determining that the first information request seeks correctional facility operational information;
    transmitting the correctional facility operational information to the communication device;
    receiving a second information request from the communication device;
    identifying a second keyword related to personal inmate information from the second information request to determine that the second information request seeks personal inmate information;
    determining, based on the second keyword, that an authorization check of the communication device is required prior to transmission of the personal inmate information;
    verifying that the communication device is authorized to receive personal inmate information via an authorization scheme in response to determining that the second information request seeks personal inmate information;
    fetching the personal inmate information from a second memory in response to the verifying; and
    transmitting the personal inmate information to the communication device.

2. The method of claim 1, wherein the first information request is textual data and the second information request is audio data.

3. The method of claim 1, wherein the transmitting the correctional facility operational information includes packaging the correctional facility operational information as textual data.

4. The method of claim 1, wherein the transmitting the personal inmate information includes packaging the personal inmate information as audio data.

5. The method of claim 1, wherein the second memory is a database coupled to a correctional facility inmate monitoring system.

6. The method of claim 1, wherein the first memory corresponds to a first portion of resident status database and the second memory corresponds to a second portion of the resident status database.

* * * * *